(12) United States Patent
Doux

(10) Patent No.: US 6,363,115 B1
(45) Date of Patent: Mar. 26, 2002

(54) CODING A SEQUENCE OF PICTURES

(75) Inventor: Anne-Claude Doux, Paris (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/186,601

(22) Filed: Nov. 5, 1998

(30) Foreign Application Priority Data

Nov. 7, 1997 (EP) ............................................. 97402681

(51) Int. Cl.$^7$ ................................................. H04N 7/12
(52) U.S. Cl. ................................... 375/240.16; 348/699
(58) Field of Search ....................... 375/240.16, 240.12, 375/240.02, 240.08; 348/699, 416.1; 382/236, 238, 243; 386/109, 111; 358/261.2, 430

(56) References Cited

U.S. PATENT DOCUMENTS

| | | | | |
|---|---|---|---|---|
| 5,473,379 A | * | 12/1995 | Horne | .......................... 348/416 |
| 5,627,601 A | | 5/1997 | Ran et al. | .................... 348/699 |
| 5,657,087 A | * | 8/1997 | Jeong et al. | ................. 348/416 |
| 6,052,414 A | * | 4/2000 | Lee et al. | .................... 375/240 |
| 6,178,202 B1 | * | 1/2001 | Nakaya | ................. 375/240.16 |

FOREIGN PATENT DOCUMENTS

WO   WO9740630   10/1997   ............ H04N/7/50

OTHER PUBLICATIONS

MPEG–4 information "Q2 Core Experiment: macroblock rate control", ISO/IEC/JTC1/SC29/WG11MPEG96/M2159, Apr. 1997, Bristol (UK).

* cited by examiner

Primary Examiner—Vu Le
(74) Attorney, Agent, or Firm—Russell Gross

(57) ABSTRACT

In coding a sequence of pictures (P), a motion vector (MV) is established for a block of pixels (B(*,*;n)) in a current picture (P(n)) to be coded. The motion vector (MV) indicates a block of pixels (B(*,*;n–1)) in a previous picture (P(n–1)) which is similar to the block of pixels (B(*,*;n)) in the current picture (P(n)) to be coded. Data (D) relating to the block of pixels (B(*,*;n)) in the current picture (P(n)), is compressed (CMP). The extent to which the data (D) is compressed depends on a compression parameter (CP). The compression parameter (CP) is controlled on the basis of the motion vector (MV). Accordingly, data relating to a block of pixels representing a moving object can be compressed to a relatively small extent, whereas data relating to a block of pixels representing a stationary object can be compressed to a relatively large extent. This allows a relatively good picture quality at a decoding end.

4 Claims, 4 Drawing Sheets

CODING A SEQUENCE OF PICTURES

BACKGROUND OF THE INVENTION

1. Field of the Invention

The invention relates to coding a sequence of pictures. The invention may be applied, for example, in a video coder operating in accordance with a standard fixed by the Moving Pictures Experts Group (MPEG).

2. Description of the Related Art

Video coding in accordance with the MPEG-4 standard will comprise functions such as motion estimation, motion compensation, discrete-cosine transformation (DCT) and quantization. The motion estimation establishes a motion vector for a block of pixels in a current picture to be coded. The motion vector indicates a block of pixels in a previous picture which is similar to the block of pixels in the current picture to be coded. The motion compensation provides a prediction-error block which is the difference between the two aforementioned blocks of pixels. The prediction-error block undergoes a DCT. The result is a block of DCT coefficients. The quantization involves dividing each DCT coefficient by a quantization parameter and rounding off the result to the nearest integer.

In MPEG-4 information "Q2 Core Experiment: macroblock rate control", ISO/IEC JTC1/SC29/WG11 MPEG96/M2159, April 1997, Bristol (UK), a proposal has been made for controlling the quantization parameter block-by-block. For each block of pixels, a sum of squared values in the prediction-error block is calculated. This sum is referred to as the sum of absolute differences (SAD). The quantization parameter is controlled on the basis of the SAD.

It is an object of the invention to code of a sequence of pictures such that a relatively good picture quality can be obtained at a decoding end.

The invention takes the following aspects into consideration. The perceived picture quality at a decoding end is mainly determined by certain portions in a picture which a viewer regards as being "interesting". In many cases, a viewer will focus on moving objects rather than on stationary objects. Thus, the precision with which moving objects are coded will greatly influence the perceived picture quality.

The invention builds on the following features. A motion vector is established indicating a block of pixels in a previous picture which is similar to a block of pixels in a current picture to be coded. Data relating to the block of pixels in the current picture is compressed, the extent to which the data is compressed depending on a compression parameter. These features are comprised in, for example, MPEG video-coding in which blocks of DCT coefficients constitute the data to be compressed, and the quantization parameter constitutes the compression parameter.

In accordance with the invention, the compression parameter is controlled on the basis of the motion vector. Accordingly, data relating to a block of pixels representing a moving object can be compressed to a relatively small extent, whereas data relating to a block of pixels representing a stationary object can be compressed to a relatively large extent. Such a motion-vector based control of the quantization parameter makes that a moving object is coded with a relatively great precision. Thus, the invention allows a relatively good picture quality at a decoding end.

It should be noted that there are two basic methods of controlling the compression parameter on the basis of the motion vector. In one basic method, a stationary camera provides a sequence of pictures to be coded. Then, a block of pixels representing a moving object will have a relatively large motion vector, and a block of pixels representing a background will have a relatively small motion vector. Consequently, data should be compressed to a relatively small extent if the motion vector is large and, conversely, data should be compressed to a relatively great extent if the motion vector is relatively small. In the other method, a camera that is tracking a moving object provides a sequence of pictures to be coded. Then, a block of pixels representing a moving object will have a relatively small motion vector, and a block of pixels representing the background will have a relatively large motion vector. Consequently, data should be compressed to a relatively small extent if the motion vector is relatively small and, conversely, it should be compressed to a relatively great extent if the motion vector is relatively large.

The invention and additional features, which may be optionally used to implement the invention to advantage, are apparent from and elucidated with reference to the drawings described hereinafter.

DESCRIPTION OF THE PREFERRED EMBODIMENTS

First, some remarks will be made on the use of reference signs. Similar entities are denoted with an identical letter code throughout the drawings. In a single drawing, various similar entities may be shown. In that case, a suffix is added to the letter code, to distinguish similar entities from each other. The suffix will be between parentheses if the number of similar entities is a running parameter. In the description and the claims, any suffix in a reference sign may be omitted if this is appropriate.

Figure 1:
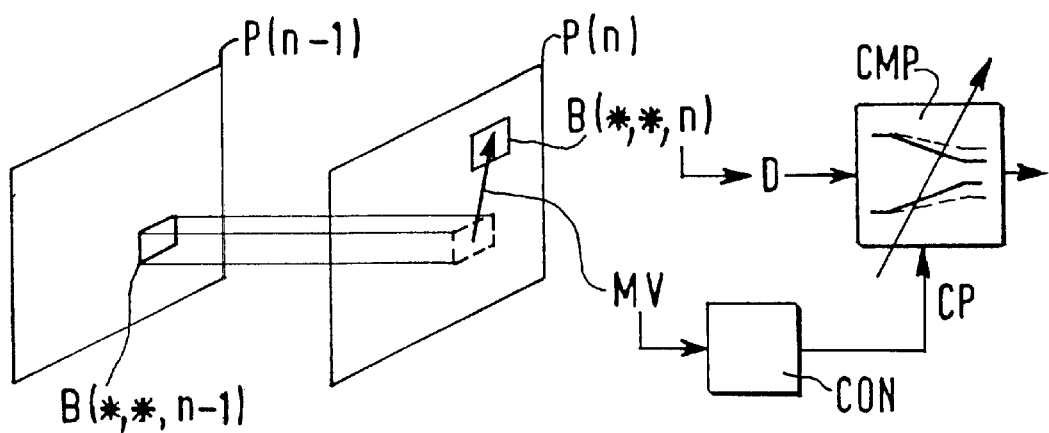
FIG. 1 is a conceptual diagram illustrating basic features of the invention.

FIG. 1 illustrates basic features of the invention. In coding a sequence of pictures P, a motion vector MV is established for a block of pixels B(*,*;n) in a current picture P(n) to be coded. The motion vector MV indicates motion of a block of pixels B(*,*;n-1) in a previous picture P(n-1) which is similar to the block of pixels B(*,*;n) in the current picture P(n) to be coded. A data compressor CMP compresses data D relating to the block of pixels B(*,*;n) in the current picture P(n). The extent to which the data D is compressed depends on a compression parameter CP. A controller CON controls the compression parameter CP on the basis of the motion vector MV.

The following aspects have been taken into consideration with regard to the basic features illustrated in FIG. 1. In many applications, the number of bits obtained by coding a sequence of pictures should preferably not exceed a certain limit. Stated otherwise, a certain number of bits is available for coding the sequence of pictures. It is beneficial to the picture quality, if a relatively great portion of the available bits is used for coding moving objects. The smaller the portion of the available bits which is used for coding stationary objects, the greater the portion which can be used for coding moving objects. Thus, it is desirable to prevent that data which relates to a block of pixels not representing a moving object, is compressed to a relatively small extent only.

Let it be assumed that the sequence of pictures P comprises a moving object. In many cases, the object will cover various blocks of pixels in each picture. If, in a particular picture, motion vectors are established for these blocks of pixels, these motions vectors will not be too different. Conversely, if a motion vector differs from its neighboring motion vectors to a relatively large extent, it is safe to assume that the block of pixels to which the motion vector belongs, does not represent a moving object or a portion thereof.

Figure 2:
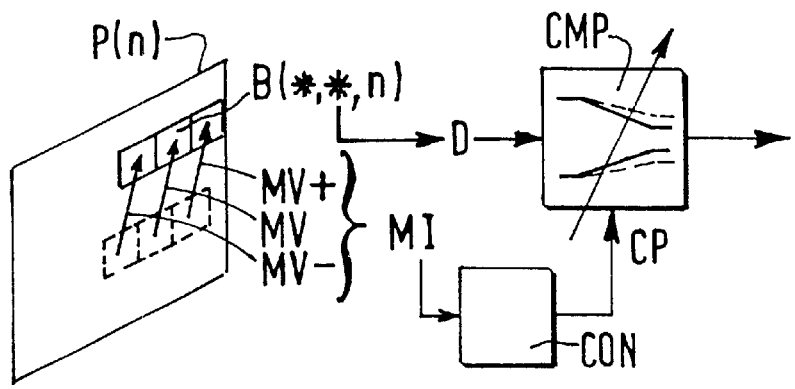
FIGS. 2 to 6 are conceptual diagrams illustrating additional features of the invention.

FIG. 2 illustrates the following features in addition to the features illustrated in FIG. 1. A motion indication MI is established for the block of pixels B(*,*;n) in the current picture P(n) on the basis of the motion vector MV belonging to the block of pixels B(*,*;n) and motion vectors MV+– MV– belonging to neighboring blocks of pixels. The controller CON controls the compression parameter CP in dependence on the motion indication MI.

The features illustrated in FIG. 2 provide the following advantageous effects. The motion indication MI allows a distinction between a block of pixels having a motion vector which is similar to its neighboring motion vectors, and a block of pixels having a motion vector which is different from its neighboring motion vectors. Consequently, the motion indication MI allows a distinction between a block of pixels which probably represents a portion of a moving object, and a block of pixels which probably does not represent a moving object, although its motion vector as such suggests the contrary. Since the compression parameter CP is controlled in dependence on the motion indication MI, it can be prevented that data relating to a block of pixels which does not represent a moving object, is compressed to a relatively small extent only. This allows a relatively great portion of the available bits to be used for coding moving objects. Thus, the features illustrated in FIG. 2 contribute to the picture quality.

The following aspects have also been taken into consideration with regard to the basic features illustrated in FIG. 1. It may happen that a sequence of pictures, or a portion thereof, represents a scene which is rather static. In that case, most of the motion vectors in a picture will be due to random effects, rather than to moving objects. In other words, most of the motion vectors constitute noise. If the compression parameter CP were controlled in dependence on such motion vectors, its value would vary block-by-block in a random manner. Such a random variation of the compression parameter CP will generally have an adverse effect on the picture quality at a decoding end. This is all the more true because, if the compression parameter CP is adjusted in value, this adjustment has to be coded which requires a certain number of bits that otherwise might be used for coding the picture itself.

Figure 3:
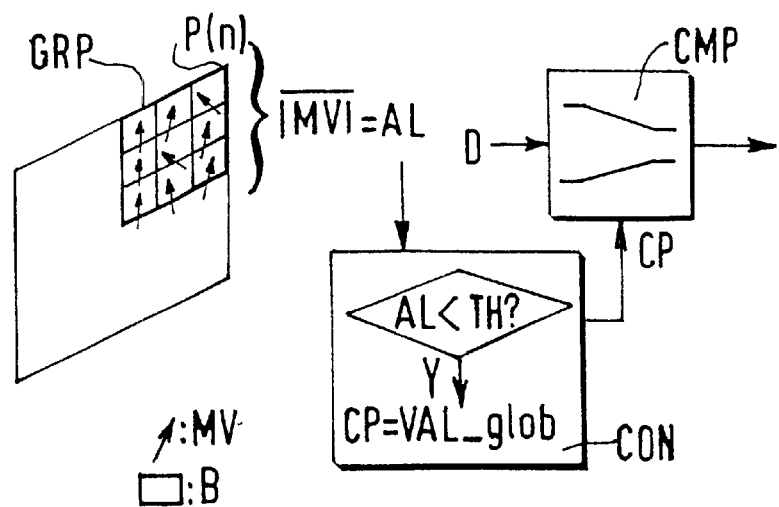

FIG. 3 illustrates the following features in addition to the features illustrated in FIG. 1. An average length AL of motion vectors MV, belonging to a group GRP of blocks of pixels, is calculated. If the average length AL is below a threshold TH, the controller CON maintains the compression parameter CP at a global value VAL_glob for compressing data D relating to the group GRP of blocks of pixels.

The features illustrated in FIG. 3 provide the following advantageous effects. If the average length AL of the motion vectors MV is below the threshold TH, it is likely the that the group GRP of blocks of pixels represents a scene which is rather static. Since, in that case, the compression parameter CP is maintained at the global value VAL_glob, and thus is not adjusted block-by-block, it is prevented that random effects influence the compression of data D. Thus, the features illustrated in FIG. 3 contribute to picture quality.

The following aspects have also been taken into consideration with regard to the basic features illustrated in FIG. 1. Human vision has a resolution which is greater in a horizontal and a vertical direction than in a diagonal direction. A viewer will, therefore, be able to distinguish finer details of an object if it substantially moves in horizontal or vertical direction than if it moves in a diagonal direction.

Figure 4:
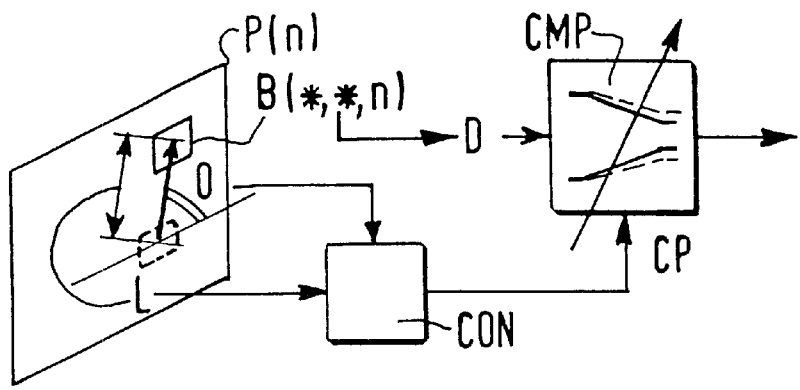

FIG. 4 illustrates the following features in addition to the features which have been discussed with reference to FIG. 1. The controller CON controls the compression parameter CP on the basis of the length L and the orientation O of the motion vector MV. The features illustrated in FIG. 4 provide the following advantageous effects. Since the compression parameter CP is controlled, not only on the basis of the length L of the motion vector MV, but also on the basis of its orientation O, data can be compressed to a greater or to a smaller extent depending on whether it represents an object moving in a substantially diagonal direction, or an object moving in a substantially horizontal or vertical direction, respectively. Thus, the data compression can be controlled in accordance with the properties of human vision so as to make an efficient use of the available bits. Consequently, the features illustrated in FIG. 4 contribute to the picture quality.

The following aspects have also been taken into consideration with regard to the features illustrated in FIG. 1. It has been explained hereinbefore that the picture quality is substantially influenced by the extent to which 'interesting' blocks of pixels are compressed. A block of pixels representing a moving object is 'interesting'. However, a block of pixels comprising many (new) details is also 'interesting'.

Figure 5:
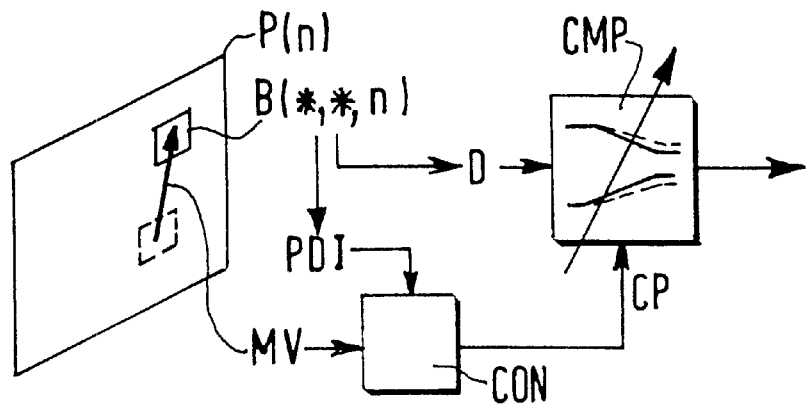

FIG. 5 illustrates the following features in addition to the features illustrated in FIG. 1. A picture-detail indication PDI is established for the block of pixels B(*,*;n) to be coded. The compression parameter CP is controlled on the basis of the motion vector MV and the picture-detail indication PDI.

The additional features illustrated in FIG. 5 provide the following advantageous effects. The motion vector MV and the picture-detail indication PDI, in combination, provide a relatively precise indication of whether the block of pixels is 'interesting' and, if so, to what extent. Since the compression parameter CP is controlled on the basis of this combination, a close correspondence can be achieved between the extent to which the block of pixels is interesting, and the extent to which the data relating to it is compressed. Thus, the FIG. 5 features contribute to the picture quality.

The following aspects have also been taken into consideration with regard to the features illustrated in FIG. 1. In order to achieve a sufficiently homogeneous picture quality, it is desirable that the extent to which the data D is compressed, is substantially independent from the position of the current picture P(n) to be coded in the sequence of pictures, and is substantially independent from the position of the blocks of pixels B(*,*;n) in the picture itself. If the compression parameter CP is adjusted on a block-by-block basis, there is a potential risk that, on average, its value gradually increases or decreases throughout the coding of a picture, without this being necessitated by the motion vectors concerned. In other words, there is a risk that there is a certain drift in the value of the compression parameter CP. Such a drift will generally adversely affect the picture quality.

Figure 6:
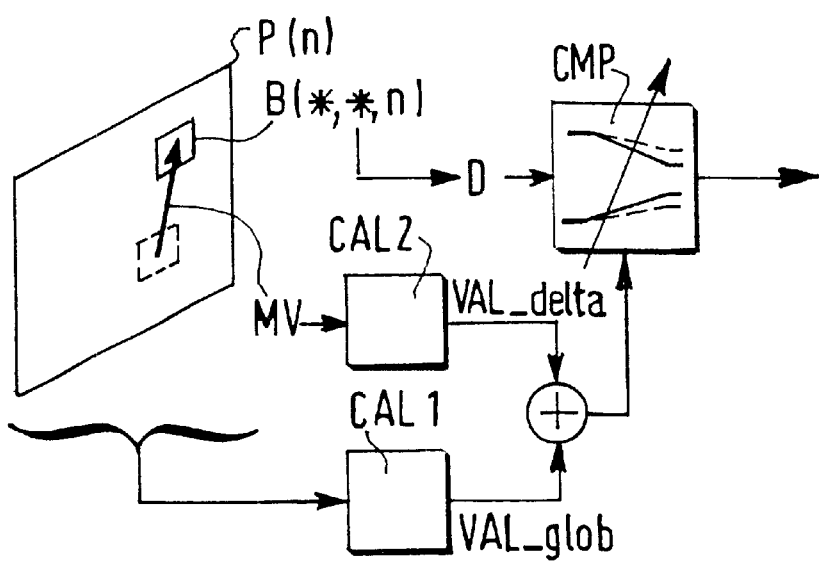

FIG. 6 illustrates the following features in addition to the features illustrated in FIG. 1. A calculator CAL1 calculates a global value VAL_glob for the compression parameter CP. The global value VAL_glob is valid for all blocks of pixels in the current picture P(n). A calculator CAL2 calculates a delta value VAL_delta for the compression parameter CP on the basis of the motion vector MV. The controller CON controls the compression parameter CP in dependence on a sum of the global value VAL_glob and the delta value VAL_delta.

The features illustrated in FIG. 6 provide the following advantageous effects. The compression parameter CP will have a value which may fluctuate but which, on average, will be substantially equal to the global value VAL_glob for the picture concerned. This prevents the compression parameter CP from drifting away in value throughout the coding of the picture and, consequently, it ensures a sufficiently homogeneous picture quality. Thus, the features illustrated in FIG. 6 contribute to the picture quality.

Figure 7:
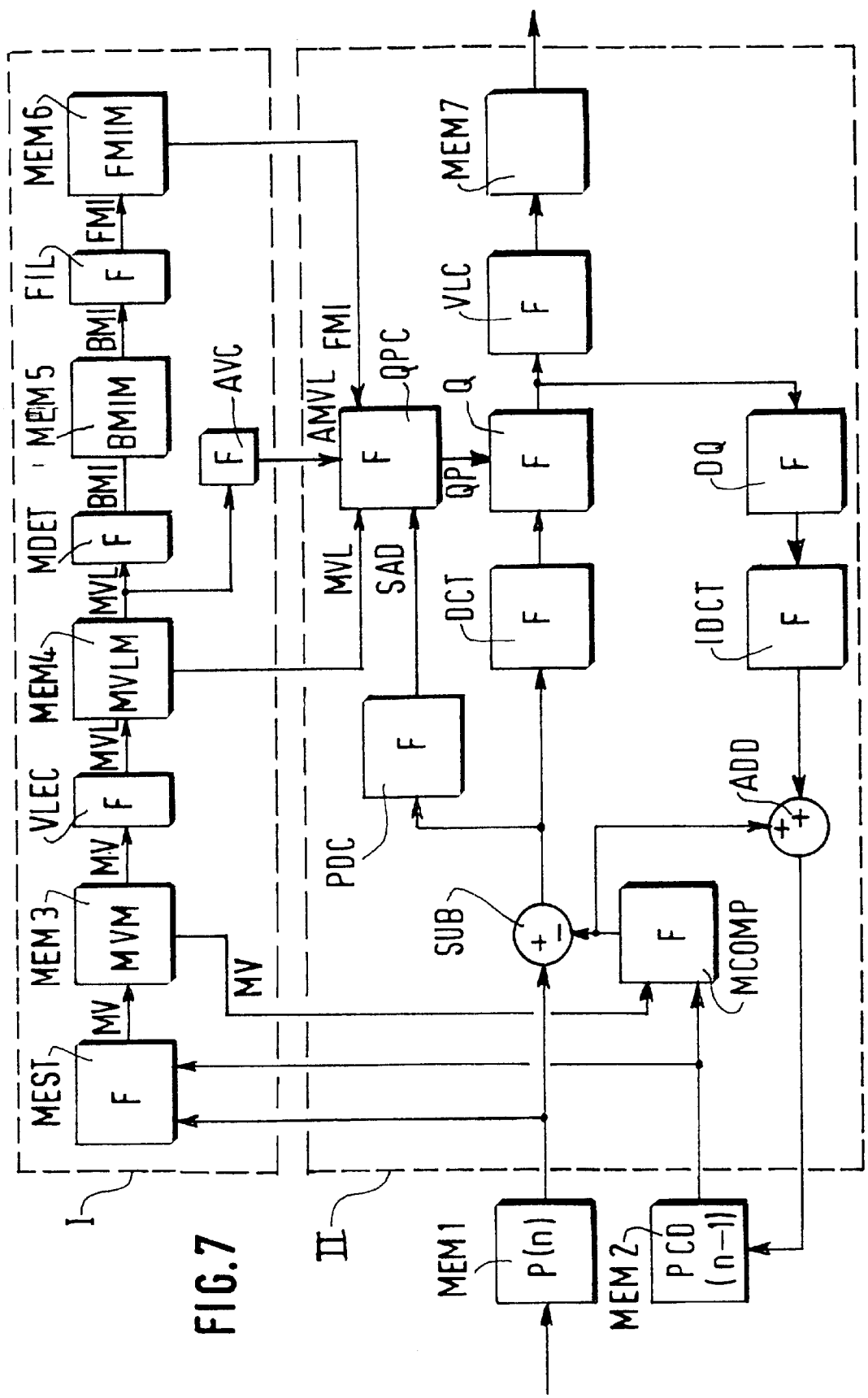
FIG. 7 is a functional block diagram of an example of an MPEG video coder in accordance with the invention.

FIG. 7 illustrates an example of an MPEG video coder which recaptures the features illustrated in FIGS. 1–6 and discussed hereinbefore. The MPEG video coder provides an MPEG data stream DS representing a sequence of pictures P.

FIG. 7 is a functional block schematic diagram in which a block having the letter F in its interior represents a data processing function. The MPEG video coder illustrated in FIG. 7 comprises the following data processing functions: motion estimation MEST, vector length calculation VLEC, average calculation AVC, motion detection MDET, filtering FIL, motion compensation MCOMP, subtraction SUB, picture-detail calculation PDC, discrete cosine transformation DCT, quantization parameter control QPC, quantization Q in dependence on a quantization parameter QP, variable length coding VLC, de-quantization DQ, inverse discrete cosine transformation IDCT, and addition ADD. The other blocks represent memories MEM for storing data to be processed or data which has been processed, or both. A reference sign in the interior of such a block indicates which type of data is stored in the memory MEM. Memory MEM1 contains a current picture P(n) which has to be coded. Memory MEM2 contains a coded-and-decoded version of a previous picture PCD(n−1). The current picture P(n) as well as the coded-and decoded version of the previous picture PCD(n−1), comprise macro-blocks of 16 by 16 pixels.

FIG. 7 comprises two main parts: a part I and a part II. The part I comprises data processing functions which constitute a preparation for coding a group of macro-blocks in the current picture P(n). The part II comprises data processing functions which constitute the actual coding of each macro-block. That is, the processing functions in part I are first applied to the group of macro-blocks in the current picture P(n), after which the processing functions in part II are applied to each individual macro-block.

The processing functions comprised in the part I will now be discussed in greater detail. For each macro-block in the group, the motion estimation MEST searches a similar block of 16-by-16 pixels in the coded-and-decoded version of the previous picture PCD(n−1). The result of this search is a motion vector MV which indicates the similar block found in the search. For example, the motion vector MV may comprise x,y coordinates−1,2 indicating that the similar block of 16-by-16 pixels in the coded-and decoded version of the previous picture PCD(n−1), is one position to the left and two position higher with respect to the macro-block in the current picture P(n) for which the search has been carried out. The motion vectors MV thus obtained are stored in memory MEM3. As a result, the memory MEM3 will comprise a motion vector map MVM for the group of macro-blocks for which the motion estimation MEST has been carried out. The motion vector map MVM is, in fact, a matrix, each element of which is a motion vector MV for a different macro-block.

The vector length calculation VLEC provides a motion vector length MVL for each motion vector in the motion vector map MVM. Accordingly, a motion vector length map MVLM is obtained for the group of macro-blocks concerned. The motion vector length MVL is calculated as follows: $MVL=|MVx|+|MVy|+||MVx|-|Mvy||$ with MVx and MVy being the x and the y component, respectively, of the motion vector MV. The motion vector length MVL thus calculated generally does not correspond to the real length of the motion vector MV. For example, let it be assumed that $|MVx|=0$ and that $|MVy|=1$. In that case MVL=2, whereas the real motion vector length is 1. If, however, $|MVx=1|$ and $|Mvy=1|$, MVL=2 which is indeed the real motion vector length. Generally, the motion vector length MVL calculated will exceed the real motion vector length by an amount which increases as the motion vector's orientation is more horizontal or vertical than diagonal. Thus, a greater weight is given to motion in a horizontal or a vertical direction than to motion in a diagonal direction. This corresponds to human visual perception in the sense that the eyes' resolution is not isotropic: the eyes are able to distinguish higher frequencies in a horizontal or vertical direction than in a diagonal direction.

The average calculation AVC calculates an average of the motion vector lengths MVL contained in the motion vector length map MVLM. As a result, an average motion vector length AMVL is obtained. The average motion vector length AMVL is compared with a threshold value, for example, 2. The result of this comparison has an impact on the data processing functions comprised in part II as will be discussed hereinafter.

The motion detection MDET provides a binary motion indication BMI for each motion vector length MVL contained in the motion vector length map MVLM. It does so by comparing the motion vector length MVL with a threshold value. If the motion vector length MVL is above the threshold value, the binary motion indication BMI has the value 1. If not, the binary motion indication BMI has the value 0. Accordingly, a binary motion indication map BMIM is obtained for the group of macro-blocks concerned, in which each binary motion indication BMI is associated with a different macro-block and indicates whether the macro-block represents a moving object, or rather a portion thereof, or not.

Figure 8A:
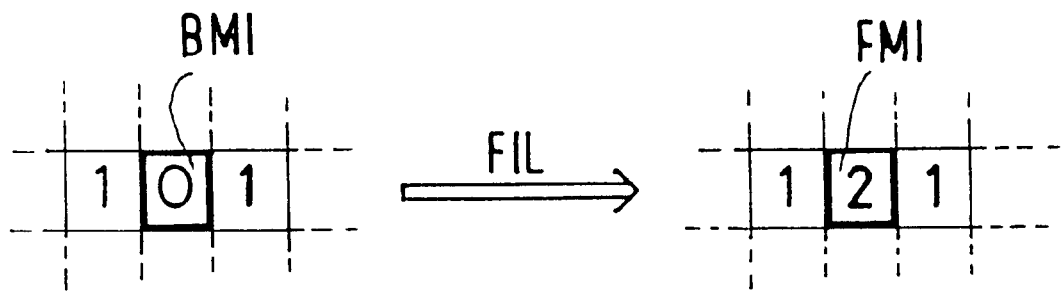
FIGS. 8a to 8d illustrate the operation of a filter in the MPEG video coder.

The filtering FIL compares each binary motion indication BMI with one or more of its neighboring binary motion indications and provides a filtered motion indication FMI in dependence on the outcome of this comparison. Accordingly, a filtered motion indication map FMIM is obtained. In any of the following cases 1, 2, 3, and 4, the filtered motion indication FMI will have a value which is different from the corresponding binary motion indication BMI. In any other case, the filtered motion indication FMI will have a value which is identical to the value of the corresponding binary motion indication BMI. FIG. 8a illustrates case 1 in which the binary motion indication BMI belonging to a certain macro-block is 0, but the binary motion indication belonging to the preceding macro-block and that belonging to the following macro-block are both 1. In this case, the filtered motion indication FMI for the macro-block in question is given the value 2. The value 2 indicates that, although the motion vector length is below the threshold value, the macro-block probably represents a portion of a moving object. The moving object should, in its entirety, be coded with greater precision than stationary objects. As will be shown hereinafter, this is achieved by giving the value 2 to the filtered motion indication FMI for the macro-block concerned.

An example of a macro-block for which the filtered motion indication FMI may be 2, is a macro-block representing a cheek of a person who is talking in a videophone picture sequence. The cheek is a moving object and, consequently, most of the macro-blocks representing it will have a binary motion indication BMI which is 1. However, the middle of the cheek will generally move to a relatively little extent. Accordingly, the binary motion indication BMI for a macro-block in the middle of the cheek may be 0, whereas the binary motion indications for neighboring macro-blocks are 1. In that case, the filtered motion indication FMI for the macro-block in the middle of the cheek will be 2. It will hereinafter be shown that, as a result, the entire cheek is coded with sufficient precision which contributes to the perceived overall picture quality.

Figure 8B:
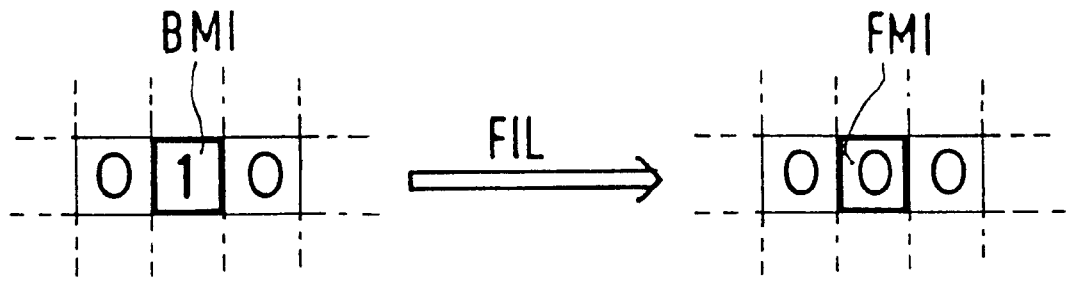

FIG. 8b illustrates case 2 in which the binary motion indication BMI belonging to a certain macro-block is 1, but the binary motion indication belonging to the preceding macro-block and that belonging to the next macro-block are both 0. In this case, the filtered motion indication FMI for the macro-block concerned is given the value 0. The value 0 is given because the macro-block concerned does probably not represent a portion of a moving object. Otherwise, at least one of the neighboring binary motion indications would have had the value 1. The fact that the binary motion indication BMI for the macro-block concerned is 1 instead of 0, which is the value of its neighbors, is probably due to random effects. As will be shown hereinafter, by giving the value 0 to the filtered motion indication FMI for the macro-block concerned, it is prevented that the quantization parameter is adjusted as a result of random effects which is undesirable.

Figure 8C:
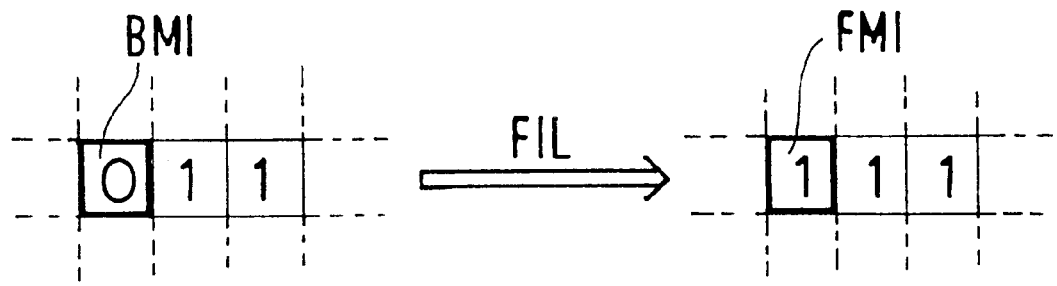

FIG. 8c illustrates case 3 in which the binary motion indication BMI belonging to a certain macro-block is 0, but the binary motion indications belonging to the two following macro-blocks are 1. In this case, the filtered motion indication FMI for the macro-block concerned is given the value 1. A succession of two or more macro-blocks having binary motion indications which are 1, generally represents a moving object. The moving object may need to be coded with much greater precision than the background surrounding it. However, in MPEG-coding, the coding precision cannot be increased to any given extent from one macro-block to a next macro-block. A solution is to already increase the coding precision for the macro-block concerned which precedes the succession of two or more macro-blocks representing the moving object. As will be shown hereinafter, this is achieved by giving the value 1 to the filtered motion indication FMI for the macro-block concerned.

Figure 8D:
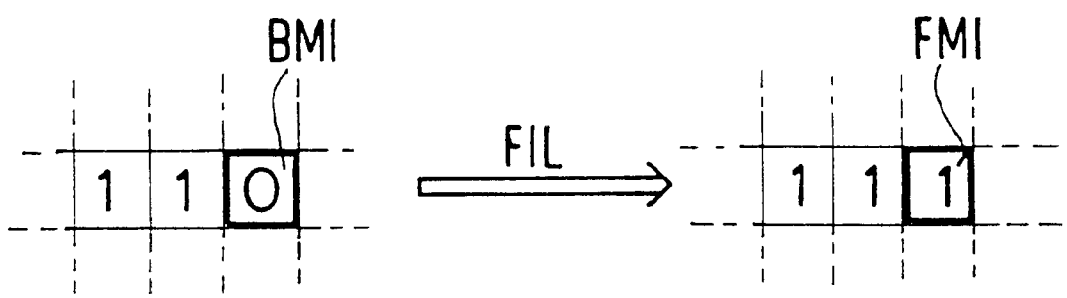

FIG. 8d illustrates case 4 in which the binary motion indication BMI belonging to a certain macro-block is 0, but the binary motion indications belonging to the two preceding macro-blocks are 1. In this case, the filtered motion indication FMI for the macro-block concerned is given the value 1. The macro-block concerned is adjacent to a moving object. The macro-block concerned in case 3 illustrated by FIG. 8c, is also adjacent to a moving object. Any of these macro-blocks may represent a part of a background which, in previously coded pictures, has been shielded off by the moving object. Consequently, any of these macro-blocks may constitute new information. If this is so, there will generally be no macro-block in the previous picture which is substantially similar to the macro-block constituting the new information. For that reason, it is preferable that the macro-block constituting the new information is coded with relatively great precision in order to avoid so-called block effects. As will be shown hereinafter, this is achieved by giving the value 1 to the filtered motion indication FMI for the macro-blocks concerned in cases 3 and 4 illustrated by FIGS. 8c and 8d, respectively.

The processing functions comprised in the part II will now be discussed in greater detail. As mentioned hereinbefore, these processing functions are carried out for each individual macro-block instead of for a group of macro-blocks as the processing functions comprised in part I.

The picture-detail calculation PDC and the quantization parameter control QPC is not carried out if the average motion vector length AMVL is below the threshold value. If the average motion vector length AMVL is below the threshold value, a global value VAL_glob for the quantization parameter QP is applied for the quantization Q of each macro-block in the group. In any case, the global value VAL_glob is calculated before the coding of the current picture P(n) starts and is valid during the coding of the current picture P(n). The global value VAL_glob for the quantization parameter QP may be calculated on the basis of the amount of data which has been obtained by coding the previous picture P(n−1), or a portion thereof, the value of the quantization parameter QP which was then used, the bit rate of the MPEG data stream DS, and the amount of data contained in memory MEM7 which constitutes an output buffer for providing coded pictures in the form of a regular bit stream. U.S. Pat. No. 5,680,483 corresponding to European Patent Application EP-A-0 670 663 describes an example of such a quantization parameter calculation.

The motion compensation MCOMP reads from the motion vector map MVM, the motion vector MV which belongs to the macro-block to be coded. It uses the motion vector MV to provide the similar block of 16-by-16 pixels contained in the coded-and-decoded version of the previous picture PCD(n−1). The subtraction SUB of the similar block of 16-by-16 pixels from the macro-block to be coded, provides a prediction-error macro-block. The discrete-cosine transformation DCT transforms the prediction-error macro-block into a block of DCT-coefficients. The picture-detail calculation PDC provides a sum of the squared values in the prediction error macro-block which has been provided by the subtraction SUB. This sum is hereinafter referred to as the sum of absolute differences SAD. As mentioned hereinbefore, the picture-detail calculation PDC is carried out only if the average motion vector length AMVL is above the threshold value.

The quantization parameter control QPC, which is carried out only if the average motion vector length AMVL is above the threshold value, first calculates a desired value VAL_des for the quantization parameter QP. The desired value VAL_des is the sum of the global value VAL_glob and a delta value VAL_delta: VAL_des=VAL_glob+VAL_delta. The delta value VAL_delta depends on the sum of absolute differences SAD, the motion vector length MVL, and the filtered motion indication FMI belonging to the macro-block to be coded. The sum of absolute differences SAD is classified as low, average or high depending on its value. Similarly, the motion vector length MVL is classified as null, average or high depending on its value. The table below shows which delta value VAL_delta applies.

|        | FMI = 0    | FMI = 1 & MVL = average; or FMI = 2 | FMI= 1 & MVL = high |
|--------|------------|-------------------------------------|---------------------|
| Low SAD | +range_up | 0                                   | -int_down           |
| Average SAD | +int_up | -range_down                      | -range_down         |
| High SAD | -int_down | -range_down                       | -range_down         |

With:
range_up = MIN(6,MAX(3,(0.3*VAL_glob)))
int_up = range_up/2
range_down = MIN(8,MAX(4,(0.3*VAL_glob)))
int_down = range_down/2

A macro-block will not be coded if the sum of absolute differences SAD is low and the filtered motion indication FMI has the value 0. If the latter conditions apply, the macro-block represents a rather static scene. Not coding the macro-block means that all DCT coefficients are set to zero which makes that the macro-block can be represented in the MPEG data stream DS with relatively few bits. This leaves more room, in terms of number of bits, for coding macro-blocks representing moving objects which contributes to the picture quality.

Once the desired value VAL_des for the quantization parameter QP has been calculated, the quantization parameter control QPC establishes an adapted value VAL_adp for the quantization parameter QP. The adapted value VAL_adp is equal to the desired value VAL_des if the following condition fulfilled. The difference between the desired value VAL_des and the adapted value applied for the previous macro-block, is less than 2. If this condition is not fulfilled, the adapted value VAL_adp is the adapted value applied for the previous macro-block plus 2 or minus 2, depending on whether the desired value VAL_des is above or below the previously adapted value, respectively.

The fact that the adapted value VAL_adp is not always automatically equal to the desired value VAL_des is because, in MPEG-coding, the quantization parameter's value is transmitted in a differential form. That is, a differential value is transmitted which is the difference between current quantization parameter's value and the previous quantization parameter's value. The differential value must be in a range between −2 and 2, boundaries included. Thus, any change in the quantization parameter's value between two adjacent macro-blocks, may not exceed 2.

The quantization Q divides each DCT-coefficient by the quantization parameter QP and by rounds off the result of this division to the nearest integer. The quantization parameter QP is either given the adapted value VAL_adp, when the average motion vector length AMVL is above the threshold value, or the global value VAL_glob, when the latter condition is not fulfilled. Accordingly, the quantization Q provides a block of quantized DCT coefficients.

The variable-length coding VLC transforms the block of quantized DCT-coefficients into variable length codes. The variable length codes are written into the memory MEM7 and are later removed from the memory MEM7 so as to form part of the MPEG data stream DS.

Finally, a decoded version is of the just coded macro-block is established for storage in the memory MEM2. To that end, the de-quantization DQ transforms the quantized block of DCT-coefficients into a de-quantized block of DCT-coefficients. The inverse cosine transformation IDCT transforms the de-quantized block of DCT-coefficients into a decoded error-prediction macro-block. The addition ADD of this decoded error-prediction macro-block and the similar block of 16-by-16 pixels, which has been provided by the motion compensation MCOMP discussed hereinbefore, results in a decoded version of the macro-block just coded. Thus, when all the macro-blocks of the current picture P(n) have been coded, the memory MEM2 will contain the coded-and-decoded version of the current picture, which version will be used for coding a next picture P(n+1).

As mentioned hereinbefore, the MPEG video coder illustrated in FIG. 7 recaptures the features illustrated in FIGS. 1 to 6. With regard to the features illustrated in FIG. 1, the following is noted. The prediction-error macro-block provided by the subtractor SUB in the MPEG video coder illustrated in FIG. 7, constitutes data D which relates to the macro-block to be coded as indicated in FIG. 1. The discrete cosine transformation DCT, the quantization Q in dependence on a quantization parameter QP, and the variable length coding VLC, constitute the compressor CMP as illustrated in FIG. 1.

The drawings and their description hereinbefore illustrate rather than limit the invention. It will be evident that there are numerous alternatives which fall within the scope of the appended claims. In this respect, the following closing remarks are made.

There are numerous ways of physically spreading functions or functional elements over various units. In this respect, the drawings are very diagrammatic, each representing only one possible embodiment of the invention. Thus, although a drawing shows different functional elements as different blocks, this no by means excludes that some functional elements, or all functional elements, may be implemented as a single physical unit.

What is claimed is:

1. A method for coding a sequence of pictures, the method comprising the steps:
   establishing a motion vector indicating a block of pixels in a previous picture which is similar to a block of pixels in a current picture to be coded;
   compressing data relating to the block of pixels in the current picture, the extent to which the data is compressed depending on a compression parameter;
   calculating an average length of motion vectors belonging to a group of blocks of pixels;
   maintaining the compression parameter at a global value for compressing data relating to the group of blocks of pixels, if the average length is below a threshold; and
   controlling the compression parameter on the basis of the motion vector.

2. A method for coding a sequence of pictures, the method comprising the steps:
   establishing a motion vector indicating a block of pixels in a previous picture which is similar to a block of pixels in a current picture to be coded;
   compressing data relating to the block of pixels in the current picture, the extent to which the data is compressed depending on a compression parameter;
   controlling the compression parameter on the basis of a length and an orientation of the motion vector.

3. A method for coding a sequence of pictures, the method comprising the steps:
   establishing a motion vector indicating a block of pixels in a previous picture which is similar to a block of pixels in a current picture to be coded;
   compressing data relating to the block of pixels in the current picture, the extent to which the data is compressed depending on a compression parameter;

establishing a picture-detail indication for the block of pixels in the current picture to be coded; and controlling the compression parameter on the basis of the motion vector and the picture-detail indication of the data to be compressed.

4. A method for coding a sequence of pictures, the method comprising the steps:

establishing a motion vector indicating a block of pixels in a previous picture which is similar to a block of pixels in a current picture to be coded;

compressing data relating to the block of pixels in the current picture, the extent to which the data is compressed depending on a compression parameter;

calculating a global value for the compression parameter which is valid for all blocks of pixels in the current picture;

calculating a delta value for the compression parameter on the basis of the motion vector; and controlling the compression parameter in dependence on a sum of the global value and the delta value.

* * * * *